(12) United States Patent
Geisbrecht et al.

(10) Patent No.: US 6,635,375 B1
(45) Date of Patent: Oct. 21, 2003

(54) PLANAR SOLID OXIDE FUEL CELL WITH STAGED INDIRECT-INTERNAL AIR AND FUEL PREHEATING AND REFORMATION

(75) Inventors: Rodney A. Geisbrecht, New Alexandria, PA (US); Mark C. Williams, Morgantown, WV (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 305 days.

(21) Appl. No.: 09/865,424

(22) Filed: May 29, 2001

(51) Int. Cl.[7] .......................... H01M 8/10; H01M 2/00; H01M 2/02; H01M 2/14
(52) U.S. Cl. ............................ 429/30; 429/34; 429/38; 429/39
(58) Field of Search ........................... 429/13, 17, 26, 429/30, 34, 38, 39

(56) References Cited

U.S. PATENT DOCUMENTS

| | | | | |
|---|---|---|---|---|
| 5,340,664 A | * | 8/1994 | Hartvigsen .................... 429/20 |
| 5,554,454 A | * | 9/1996 | Gardner et al. ................ 429/19 |
| 5,595,833 A | * | 1/1997 | Gardner et al. ................ 429/19 |
| 5,858,314 A | * | 1/1999 | Hsu et al. .................... 422/211 |
| 5,900,329 A | * | 5/1999 | Reiter et al. .................. 429/17 |
| 5,942,344 A | * | 8/1999 | Lehmeier et al. .............. 429/13 |
| 6,017,646 A | * | 1/2000 | Prasad et al. ................. 429/13 |
| 6,051,331 A | * | 4/2000 | Spear, Jr. et al. ............. 429/34 |
| 6,146,779 A | * | 11/2000 | Walsh ......................... 429/26 |
| 6,294,278 B1 | * | 9/2001 | Wohr et al. ................... 429/24 |
| 6,296,963 B1 | * | 10/2001 | Nanjo ......................... 429/38 |
| 6,394,207 B1 | * | 5/2002 | Skala ........................ 180/65.2 |
| 6,436,561 B1 | * | 8/2002 | Hart-Predmore et al. ...... 429/12 |
| 6,489,050 B1 | * | 12/2002 | Ruhl et al. .................... 429/26 |

* cited by examiner

*Primary Examiner*—Randy Gulakowski
*Assistant Examiner*—Donald V. Scaltrito
(74) *Attorney, Agent, or Firm*—Brian J. Lally; Daniel D. Park; Paul A. Gottlieb

(57) ABSTRACT

A solid oxide fuel cell arrangement and method of use that provides internal preheating of both fuel and air in order to maintain the optimum operating temperature for the production of energy. The internal preheat passes are created by the addition of two plates, one on either side of the bipolar plate, such that these plates create additional passes through the fuel cell. This internal preheat fuel cell configuration and method reduce the requirements for external heat exchanger units and air compressors. Air or fuel may be added to the fuel cell as required to maintain the optimum operating temperature through a cathode control valve or an anode control valve, respectively. A control loop comprises a temperature sensing means within the preheat air and fuel passes, a means to compare the measured temperature to a set point temperature and a determination based on the comparison as to whether the control valves should allow additional air or fuel into the preheat or bypass manifolds of the fuel cell.

14 Claims, 4 Drawing Sheets

PLANAR SOLID OXIDE FUEL CELL WITH STAGED INDIRECT-INTERNAL AIR AND FUEL PREHEATING AND REFORMATION

U.S. GOVERNMENT RIGHTS

The United States Government has rights in this invention pursuant the employer-employee relationship of the Government to the inventors as U.S. Department of Energy employees at the National Energy Technology Laboratory.

BACKGROUND OF THE INVENTION

The solid oxide fuel cell (SOFC) described here offers an improved approach to the management of waste heat within the fuel cell while reducing the size of heat exchangers and air compressors, thus decreasing the overall space requirement for SOFCs. The fluids circulating within the SOFC are internally heat exchanged and may be controlled to maintain an optimum operating temperature with the SOFC. The internal heat exchange reduces the amount of fluids (air and fuel) required to maintain as uniform a temperature as possible.

Planar SOFCs offer significant advantages for distributed generation applications, particularly for applications which exploit the fuel cell's potential for reforming fossil fuels such as natural gas and distillates at high power density. However, a number of barrier issues need to be overcome. One of these issues is high temperature heat management. Constrained to operate in the adiabatic mode where heat may not be exchanged with the surroundings, large air-fuel ratios are required in order to maintain the temperature within acceptable operating limits and to control internal thermal stresses, resulting in significant penalties in terms of increased heat exchanger and prime mover duties. The problem is exacerbated by the difficulty of controlling internal reformation of fuel, which would otherwise go a long way to reducing waste heat management loads. After reviewing the commonalities among other types of fuel cells which are nearing commercialization, including tubular solid oxide fuel cells, and internally reforming molten carbonate fuel cells, the principles presented here emerged which are advantageous for planar SOFCs. The concept, internal recuperation, is essentially a division of both anode and cathode chambers into a preheat pass and a reactive pass. Internal recuperation refers to the process by which the heat generated along the reactive pass is given up to the preheat pass. In the cathode chamber, air is counter-currently preheated against the returning air stream as it reacts over the cathode, while in the anode chamber, fuel is both preheated and reformed against the returning fuel stream as it reacts over the anode. Convective and radiative heat transfer coefficients were found to be easily large enough for the anticipated current densities of solid oxide fuel cells. When properly implemented, internal recuperation results in uniform temperature distributions over the electrolyte and related solid structures of the fuel cell. Most importantly, solid structures are shielded from extremes in both low and high temperatures that are deleterious to either operation or structural integrity.

There are other approaches to temperature control involving the bifurcation of fluid flow. One example is in U.S. Pat. No. 5,900,329 ("'329"). The '329 patent describes and claims a dual fuel cell comprising a molten carbonate fuel cell and a solid electrolyte fuel cell where the cathode waste gas is separated into two sub-flows. One sub-flow is supplemented with air, heated by a heat exchanger and sent back to the cathode section of the fuel cell. The fuel cell described in this application is a SOFC and does not require a separate heat exchanger because the fluids are preheated or cooled internally.

OBJECTS OF THE INVENTION

An object of this invention is to provide a solid oxide fuel cell and method of use that internally preheats both fuel and air in order to maintain the optimum operating temperature for the production of energy by the addition of a cathode separator plate and an anode separator plate located on either side of the bipolar plate such that these plates create additional passes through the fuel cell.

Another object of the invention is to reduce the amount of fluids (air and fuel) required to maintain an acceptable operating temperature, and thus minimize the space required for power plant construction.

Another object of the invention is to eliminate the requirement of an external heat exchanger unit by use of the described SOFC or method and, thus minimize the size of equipment and conduits required for power plant construction and operation.

Another object of the invention is to allow the addition of air or fuel to the fuel cell as required to maintain the optimum operating temperature through a cathode control valve or an anode control valve, respectively. The control valves are part of a control loop that comprises a temperature sensing means within the preheat air and fuel passes, a means to compare the measured temperature to a set point temperature and a determination based on the comparison as to whether the control valves should allow additional air or fuel into the fuel cell.

SUMMARY OF THE INVENTION

The invention is a solid oxide fuel cell arrangement and method of use that provides internal preheating of both fuel and air in order to maintain the optimum operating temperature for the production of energy. The internal preheat passes are accomplished by the addition of a cathode separator plate and an anode separator plate located on either side of the bipolar plate such that these plates create additional passes through the fuel cell. This internal preheat fuel cell configuration and method eliminate the requirement of an external heat exchanger unit. Air or fuel may be added to the fuel cell as required to maintain the optimum operating temperature through a cathode control valve or an anode control valve, respectively. The control valves are part of a control loop that comprises a temperature sensing means within the preheat air and fuel passes, a means to compare the measured temperature to a set point temperature and a determination based on the comparison as to whether the control valves should allow additional air or fuel into the fuel cell.

DETAILED DESCRIPTION OF THE PREFERRED EMBODIMENT

Figure 1:
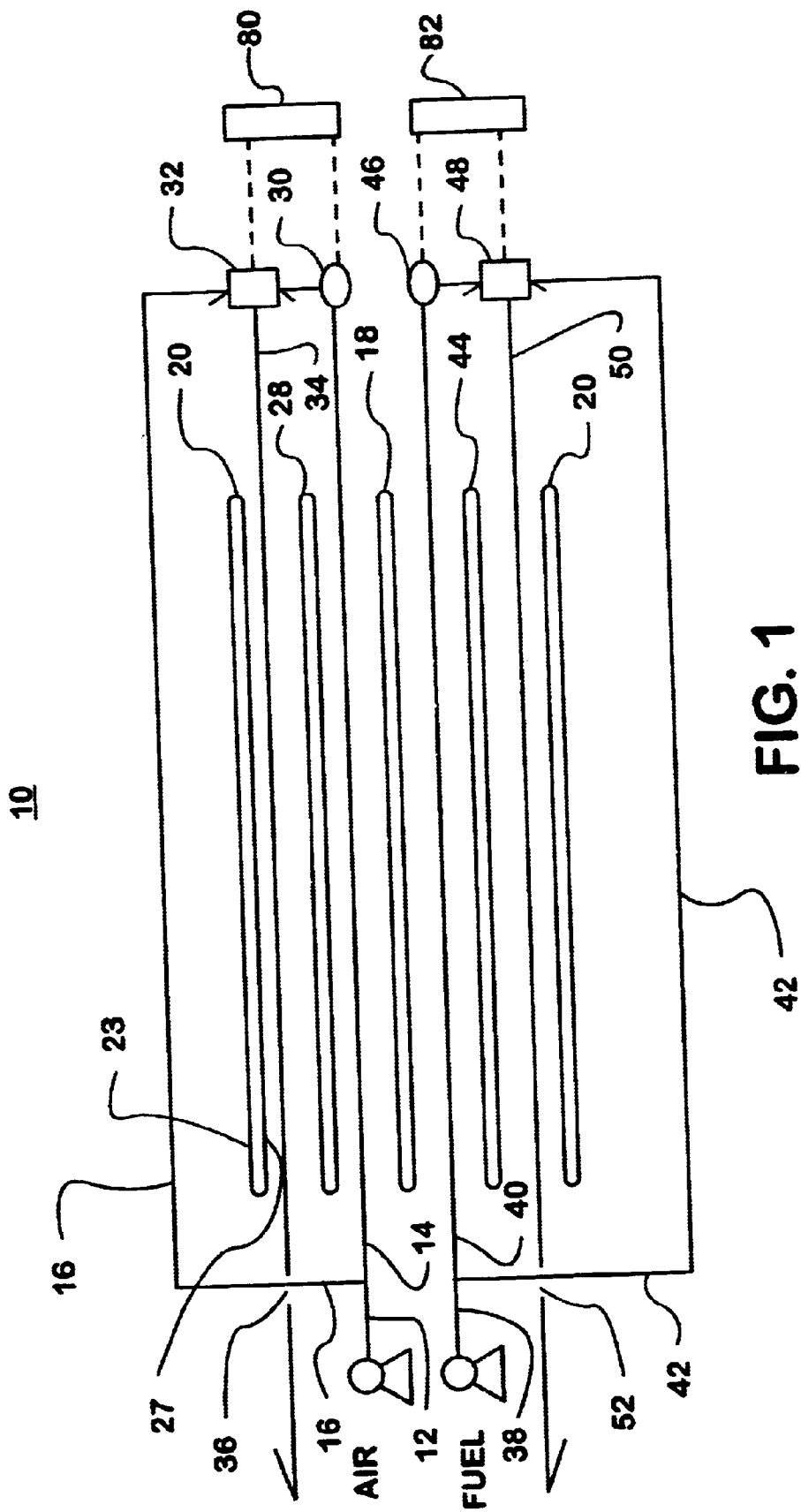
FIG. 1 is a schematic of the fluid flow of the preheat and reacting passes in a single cell.

FIG. 1 depicts the fluid flow within the SOFC 10. Air is bifurcated to form an air preheat pass 14 and an air bypass 16. The air preheat pass 14 enters the SOFC 10 through an air inlet port 12 and passes between the bipolar plate (BPP) 18 and the cathode separator plate (CSP) 28. The air preheat pass 14 then passes through a cathode preheat sensor 30 where the temperature of the preheated air is measured and compared to a set point temperature. The means by which the air temperature is measured may be by thermocouple, infrared detector, thermal resistor or any other means that is suitable for this purpose. The means by which the preheated air temperature is compared to a set point temperature may be by manual comparison or by use of an algorithm on a personal computer or by other appropriate means.

To adjust the temperature of the preheated air, air may be added to the preheat air from the bypass flow 16 by a cathode control valve 32. The cathode control valve 32 may be a variable orifice valve or constant orifice valve. The air preheat pass 14 after it passes through the cathode preheat sensor 30 is combined with air from the air bypass flow 16 and becomes the air reactive pass 34. The air reactive pass 34 passes between the CSP 28 and the Membrane Electrode Assembly (MEA) 20 on the cathode side 26 of the MEA 20.

Figure 2:
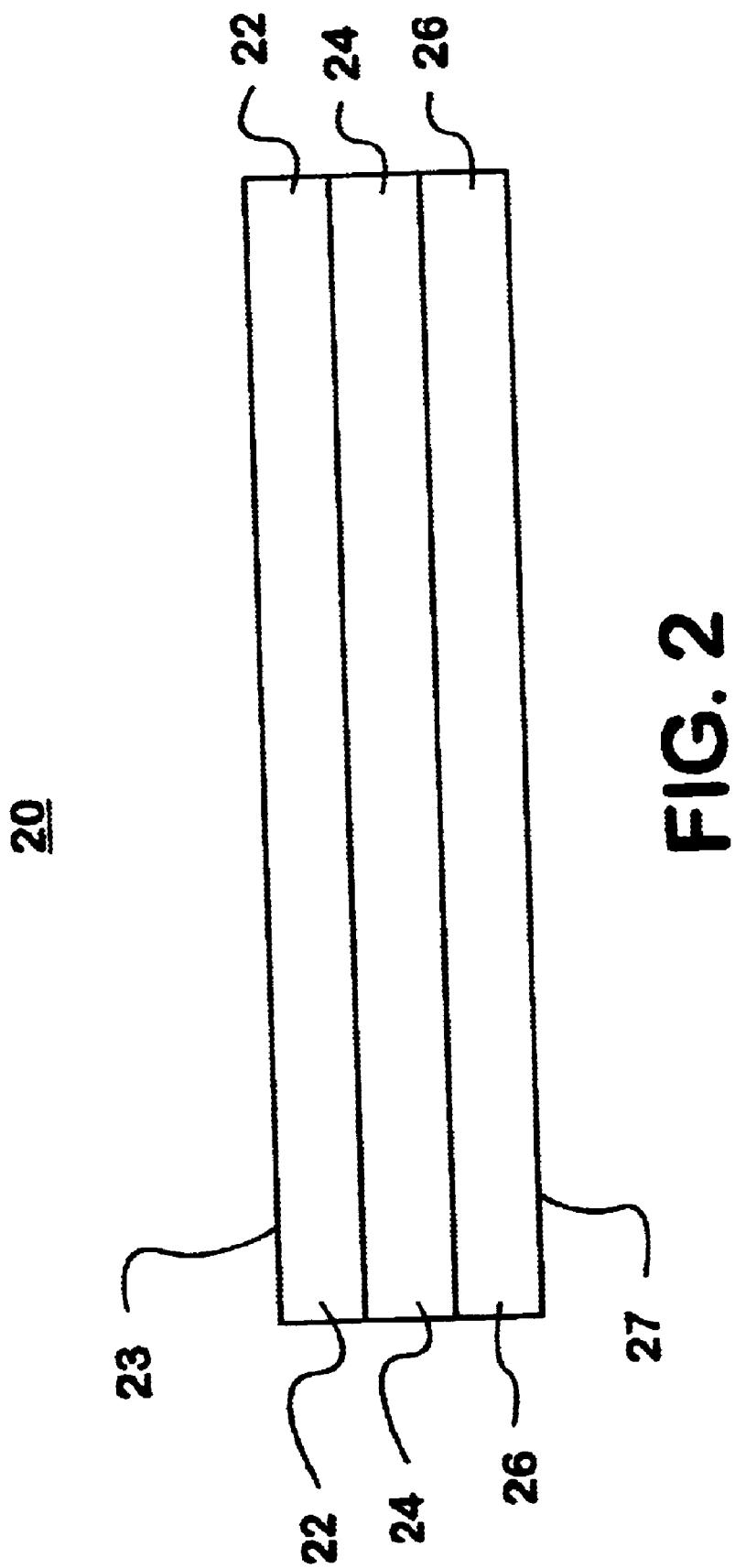
FIG. 2 is a schematic of the Membrane Electrode Assembly (MEA).

The MEA 20 is comprised of three layers: a cathode layer 26, an anode layer 22, and an electrolyte 24 layer as shown in FIG. 2. The electrolyte layer 24 is dense yttria stabilized zirconia or other conventional SOFC electrolyte and is contacted on one side by a cathode layer 26 of strontium doped lanthanum manganite or other conventional SOFC cathode material, and is contacted on the side opposite the cathode by an anode layer 22 of porous nickel cermet or other conventional SOFC anode material. Returning to FIG. 1, the MEA 20 is positioned within the SOFC 10 such that the outer surface of the cathode layer forms a cathode side 27 of the MEA 20 where the reactive air pass 34 contacts the MEA 20. Similarly, the positioning of the MEA 20 within the SOFC 10 is such that the outer surface of the anode layer 22 forms an anode side 23 of the MEA 20 where the reactive fuel pass 50 contacts the MEA 20. Once the reactive air pass 34 completes its pass between the CSP 28 and the cathode side 27 of the MEA 20, the air exits the SOFC 10 through the air exit port 36.

Fuel is bifurcated to form a fuel preheat pass 40 and enters the SOFC 10 through a fuel inlet port 38 and a fuel bypass 42. The fuel preheat pass 40 passes between the BPP 18 and the anode separator plate (ASP) 44. The fuel preheat pass 40 then passes through an anode preheat sensor 46 where the temperature of the preheated fuel is measured and compared to a set point temperature. As with the air flow passes, the means by which the air temperature is measured may be by thermocouple, infrared detector, thermal resistor or any other means that is suitable for this purpose, and the means by which the preheated fuel temperature is compared to a set point temperature may be by manual comparison or by use of an algorithm on a personal computer or by other appropriate means.

To adjust the temperature of the preheated fuel, fuel may be added to the preheated fuel from the fuel bypass flow 42 by an anode control valve 48. The fuel preheat pass 40 after it passes through the anode preheat sensor 46 is combined with fuel from the fuel bypass flow 42 and becomes the fuel reactive pass 50. The fuel reactive pass 50 passes between the ASP 44 and the MEA 20 on the anode side 23 of the MEA 20. Once the reactive fuel pass 50 is complete, the fuel exits the SOFC 10 through the fuel exit port 52.

The cathode control valve 32 and the anode control valve 48 are generally operated independently of one another, but may be operated in conjunction with one another to control the temperatures of the air reactive pass 34 and the fuel reactive pass 50, respectively.

Figure 3:
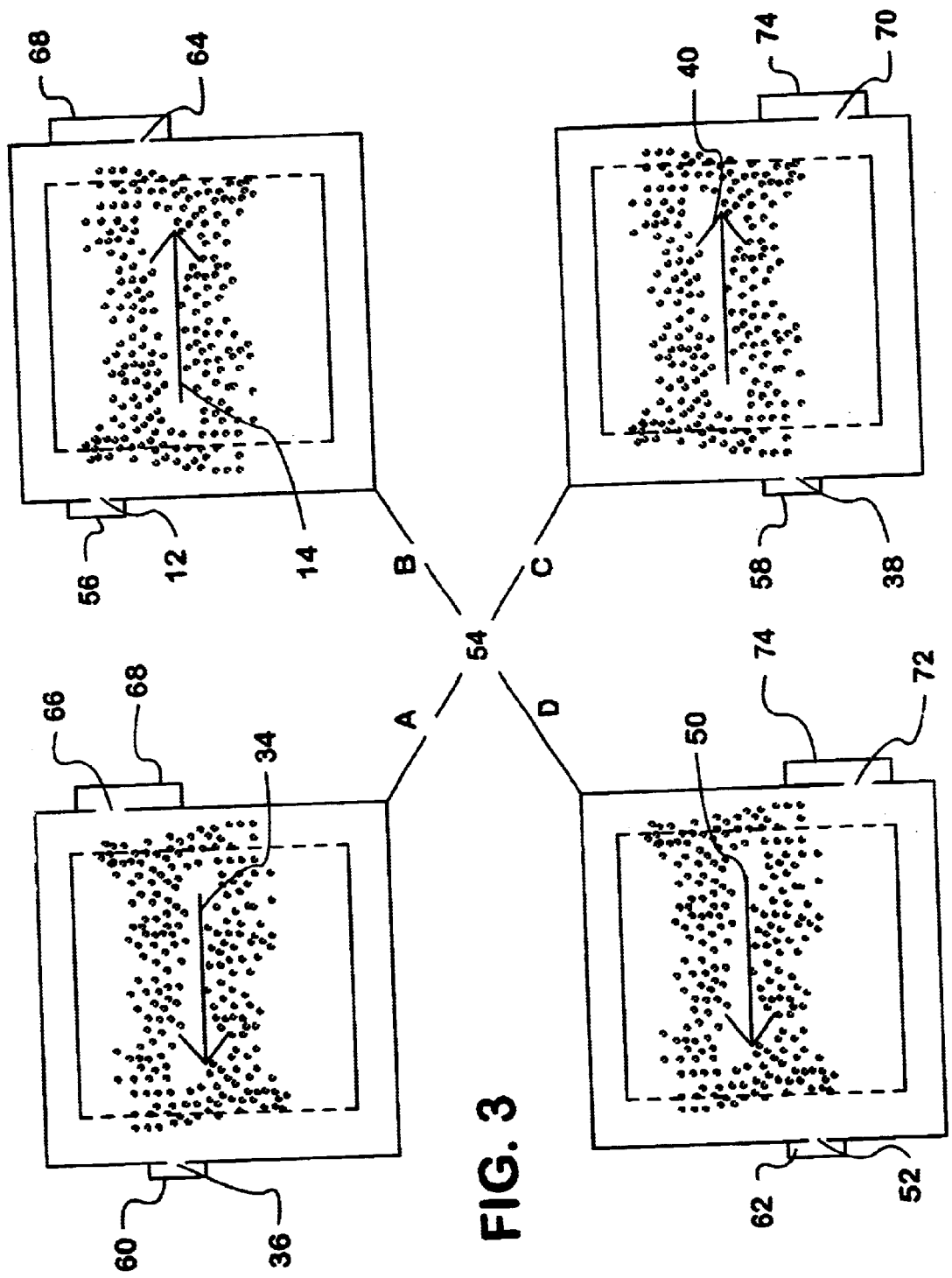
FIG. 3 is an exploded view of the preheat and reactive passes in a single cell.

Referring to FIG. 3, the SOFC 10 is supported and held together by a series of symmetric hollow frames 54. The symmetric hollow frames 54 are arranged within the completed power plant to form stacks. The symmetric hollow frame 54 is preferably square when viewing the frame 54 from the plan view. The square shape simplifies the assembly of the fuel cell stack because each frame may be rotated or flipped to fit the configuration required for each particular flow passage. The symmetrical hollow frame 54 may be rectangular or another shape, but would likely complicate assembly of the fuel cell stack because more than one type and configuration of frame unit would be required. Sealing of the interfaces between symmetric hollow frames 54 and the plates or MEA 20 is by various means, such as with a gasket made of suitable materials. In the anode preheat pass, this material could contain a suitable distribution of catalyst for the steam reforming of hydrocarbons when the fuel has been pre-humidified with a sufficient amount of steam. Electrical interconnection (current collection) between the various plates or MEA 20 is by various means, such as with a conductive felt or mesh made of suitable materials. The various plates may be folded or reticulated to facilitate this electrical interconnection.

Each SOFC 10 within a stack receives air and fuel to its air inlet port 12 and fuel inlet port 38 via an air inlet manifold 56 and a fuel inlet manifold 58, respectively. Air that has completed its pass through the SOFC 10 as the air reactive pass 34 is removed through the air exit port 36 and taken out of the SOFC 10 stack by a depleted air manifold 60. Similarly, fuel that has completed its pass through the SOFC 10 as the fuel reactive pass 50 is removed through the fuel exit port 52 and taken out of the SOFC 10 stack by a spent fuel manifold 62.

Figure 4:
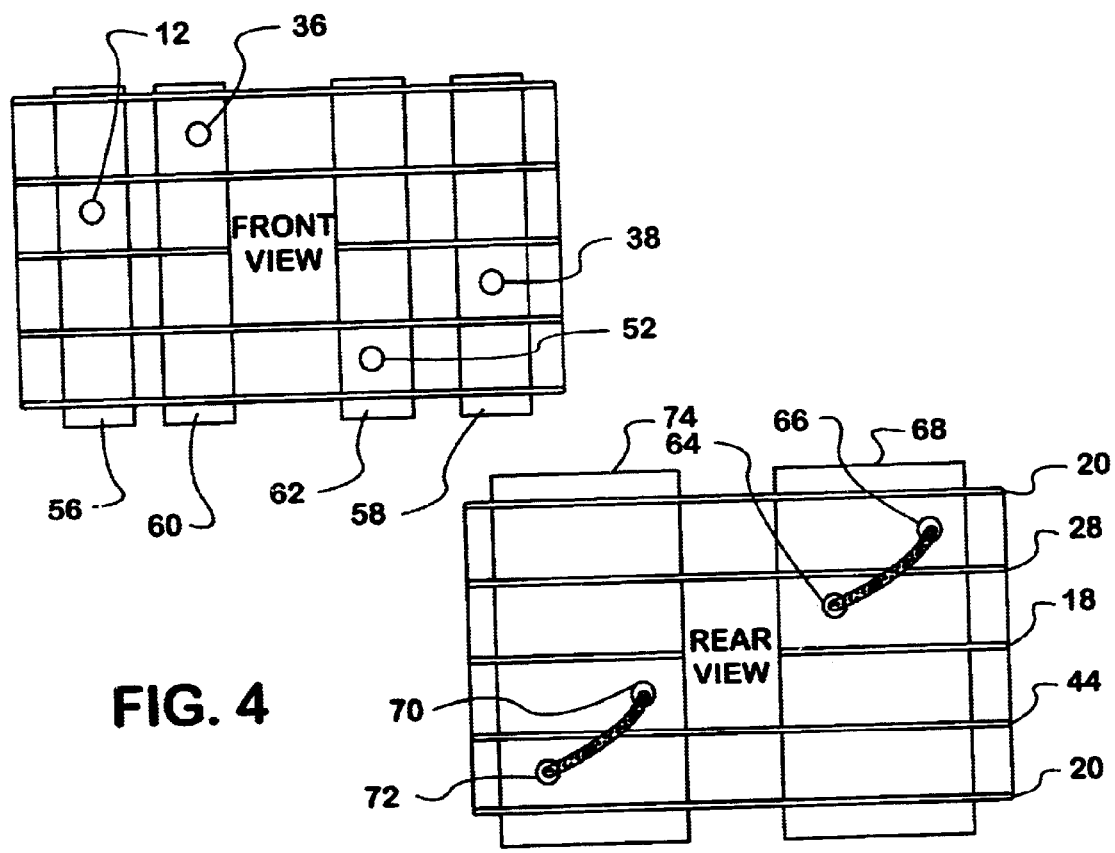
FIG. 4 is the front and rear vertical views of a single cell.

The air preheat pass 14 exits the pass between the BPP 18 and the CSP 28 through a first air return port 64 and is returned along with air from the air bypass 16 as the air reactive pass 34 through a second air return port 66 as shown in FIGS. 3 and 4. The air that passes between the first air return port 64 and the second air return port 66 may be carried within or between SOFCs 10 of the stack by a preheat air manifold 68. Similarly, the fuel preheat pass 40 exits the pass between the BPP 18 and the ASP 44 through a first fuel return port 70 and is returned along with fuel from the fuel bypass 42 as the fuel reactive pass 50 through a second fuel return port 72. The fuel that passes between the first fuel return port 70 and the second fuel return port 72 may be carried within or between SOFCs 10 of the stack by a preheat fuel manifold 74.

The control loop that comprises the cathode preheat sensor 30 and cathode control valve 32 may be implemented at the stack level to measure and control the average temperature of air that will serve as each air reactive pass 34 within the stack. Similarly, the control loop that comprises the anode preheat sensor 46 and the anode control valve 48 may be implemented at the stack level to measure and adjust the average temperature of fuel that will serve as each fuel reactive pass 50 within the stack. Or alternatively, the control loops may be implemented at the substack level, down to the individual cell level, if desired.

The method for optimizing temperature within a SOFC 10 using the herein described apparatus can be accomplished by bifurcating an air flow into an air preheat pass 14 and an air bypass 16 and then passing the air preheat pass 14 through a pass defined by the BPP 18 and the CSP 28. Passing air of the air preheat pass 14 into a cathode preheat sensor 30 where the temperature of the preheated air is measured, a cathode preheat controller 80 compares the air temperature of the air preheat pass 14 to a set point air temperature, and if the air temperature requires adjustment, will open the cathode control valve 32 to allow air from the air bypass 16 to mix with the air preheat pass 14 to form the reactive air pass 34. The reactive air pass 34 is then passed between the cathode side 26 of the MEA 20 and the CSP 28 where the air is used to facilitate an electron producing reaction. Depleted air from reactive air pass 34 exits the SOFC 10 via an air exit port 36.

The method continues similarly for the fuel flow through the SOFC 10 by bifurcating a fuel flow as it enters the SOFC 10 into a fuel preheat pass 40 and a fuel bypass 42 and then passing the fuel of the fuel preheat pass 40 into an anode preheat sensor 46 where the temperature of the preheated fuel is measured. An anode preheat controller 82 compares the fuel temperature of the fuel preheat pass 40 to a set point fuel temperature, and if the fuel temperature requires adjustment, opens the anode control valve 48 to allow fuel from the fuel bypass 42 to mix with the fuel preheat pass 40 to form the reactive fuel pass 50. The reactive fuel pass 50 is then passed between the anode side 22 of the MEA 20 and the ASP 44 where the fuel is spent in an electron producing reaction. Spent fuel from the reactive fuel pass 50 exits the SOFC 10 via a fuel exit port 52.

What is claimed is:

1. A solid oxide fuel cell, comprising:
   a symmetric hollow frame supporting a first membrane electrode assembly (MEA) and a second MEA;
   said first and said second MEAs having a cathode layer positioned such that a cathode side of said MEA is exposed within the fuel cell and an anode layer positioned such that an anode side of said MEA is exposed within the fuel cell, said cathode and said anode layers are horizontally separated by an electrolyte layer;
   said first and said second MEAs are separated by a bipolar plate (BPP);
   a cathode separator plate separates said first MEA on said cathode side from said BPP;
   an anode separator plate separates said second MEA on said anode side from said BPP; and where
      said cathode separator plate, said BPP, and said anode separator plate are arranged between said first and said second MEAs to define an air preheat pass, a reactive air pass, a fuel preheat pass, and a fuel reactive pass;
      a means for determining an air temperature located at an exit end of said air preheat pass;
      a means for comparing and controlling said air temperature to a set point air temperature;
      a cathode control valve to add air into said reactive air pass from an air bypass flow;
      a means for determining a fuel temperature located at an exit end of said fuel preheat pass;
      a means for comparing and controlling said fuel temperature to a set point fuel temperature; and
      an anode control valve to add fuel into said reactive fuel pass from a fuel bypass flow.

2. The solid oxide fuel cell of claim 1, wherein:
   said MEAs are comprised of: said electrolyte layer of dense yttria stabilized zirconia; said electrolyte contacted by said cathode layer that is strontium doped lanthanum manganite; said electrolyte layer contacted by said anode layer that is porous nickel cermet.

3. The solid oxide fuel cell of claim 1, wherein:
   said BPP, said cathode separator plate and said anode separator plate are electrically conductive.

4. The solid oxide fuel cell of claim 1, wherein:
   said cathode control valve and said anode control valve may be operated independently or in conjunction with one another.

5. The solid oxide fuel cell of claim 1, wherein said means for sensing an air temperature and were said means for sensing a fuel temperature are temperature sensory devices selected from a group consisting of: thermocouples, infrared detectors, and thermal resistors.

6. The solid oxide fuel cell of claim 1, wherein said cathode control valve and said anode control valve are valves selected from a group consisting of: variable orifice valves, and constant orifice valves.

7. The solid oxide fuel cell of claim 1, wherein the fuel cell is one of several repeating units within a stack of identical fuel cells.

8. The solid oxide fuel cell of claim 7, wherein said stack of identical fuel cells is oriented such that both said first MEA and said second MEA are contacted by said reactive air pass and said reactive fuel pass.

9. The solid oxide fuel cell of claim 7, further comprising:
   a fuel inlet manifold that is a fluid conduit that spans said stack of the fuel cells and delivers a fuel through a fuel inlet port between said BPP and said anode separator plate of individual fuel cells;
   a spent fuel manifold that is a fluid conduit that spans said stack of the fuel cells and collects and removes said fuel from between said anode separator plate and said second MEA;
   an air inlet manifold that is a fluid conduit that spans said stack of the fuel cells and delivers air between said BPP and said cathode separator plate; and
   a depleted air manifold that is a fluid conduit that spans said stack of the fuel cells and collects and removes said air from between said cathode separator plate and said first MEA.

10. The solid oxide fuel cell of claim 9, further comprising:
    a preheat fuel manifold that is a fluid conduit that spans said stack of fuel cells and collects said fuel from between said BPP and said anode separator plate through a first fuel return port and returns said fuel to said reactive fuel pass through a second fuel return port; and
    a preheat air manifold that is a fluid conduit that spans said stack of fuel cells and collects said air from between said BPP and said cathode separator plate through a first air return port and returns said air to said reactive air pass through a second air return port.

11. The solid oxide fuel cell of claim 10, wherein said symmetric hollow frame is square and where said manifold systems are oriented such that said frame and manifold systems may flipped to allow either said air or said fuel inlet ports, return ports and exit ports.

12. A solid oxide fuel cell, comprising:
    a symmetric hollow frame supporting a first membrane electrode assembly (MEA) and a second MEA;
    said first and said second MEAs having a cathode side and an anode side separated by an electrolyte;
    said first and said second MEAs are separated by a bipolar plate (BPP);
    a cathode separator plate separates said first MEA on said cathode side from said BPP;

an anode separator plate separates said second MEA on said anode side from said BPP; and said cathode separator plate, said BPP, and said anode separator plate are arranged between said first and said second MEAs to define an air preheat pass, a reactive air pass, a fuel preheat pass, and a reactive fuel pass.

13. The solid oxide fuel cell of claim 12, further comprising:

a cathode preheat sensor located at an exit end of said air preheat pass for controlling a cathode control valve, where said cathode preheat sensor measures an exit air temperature of from said air preheat pass for comparison of said exit air temperature to a set point for determination of whether said cathode control valve should allow additional air into said reactive air pass from an air bypass, where said air preheat pass and said air bypass combine to form said reactive air pass; and an anode preheat sensor located at an exit end of said fuel preheat pass for controlling an anode control valve, where said anode preheat sensor measures an exit fuel temperature of said fuel preheat pass for comparison of said exit fuel temperature to a set point for determination of whether said anode control valve should allow additional fuel into said reactive fuel pass from a fuel bypass where said fuel bypass and said fuel preheat pass combine to form said reactive fuel pass.

14. A method for optimizing air and fuel temperatures within a solid oxide fuel cell, comprising the steps of:

splitting an entrance air flow into a preheat air and an air bypass;

passing said preheat air through a preheat air conduit defined by a bipolar plate (BPP) and a cathode separator plate;

measuring a temperature of said preheat air with a cathode preheat sensor;

comparing said temperature of said preheat air to a set point air temperature;

adjusting a cathode control valve to add a volume of air from said air bypass;

combining said preheat air and said air bypass to form a reactive air flow after each passes the cathode control valve; and passing said reactive air pass through a reactive air conduit defined by said cathode separator plate and a cathode side of a first membrane electrode assembly (MEA);

splitting an entrance fuel flow into a preheat fuel and a fuel bypass;

passing said preheat fuel through a preheat fuel conduit defined by a bipolar plate (BPP) and an anode separator plate;

measuring a temperature of said preheat fuel with an anode preheat sensor;

comparing said temperature of said preheat fuel to a set point fuel temperature;

adjusting an anode control valve to add a volume of fuel from said fuel bypass;

combining said preheat fuel and said fuel bypass to form a reactive fuel flow after each passes the anode control valve; and passing said reactive fuel pass through a reactive fuel conduit defined by said anode separator plate and an anode side of a second membrane electrode assembly (MEA).

* * * * *